United States Patent

[11] 3,583,691

| [72] | Inventor | Charles J. Twine<br>Rockford, Ill. |
|---|---|---|
| [21] | Appl. No. | 827,686 |
| [22] | Filed | May 26, 1969 |
| [45] | Patented | June 8, 1971 |
| [73] | Assignee | Alco Standard Corporation<br>Valley Forge, Pa. |

[54] FURNACE WITH PREHEATED COMBUSTION AIR AND CERAMIC BURNER BLOCKS
9 Claims, 4 Drawing Figs.

| [52] | U.S. Cl. | 263/40,<br>263/20, 431/353 |
|---|---|---|
| [51] | Int. Cl. | F27b 3/02,<br>F27b 3/22 |
| [50] | Field of Search | 263/20, 19<br>A, 40; 431/353 |

[56] References Cited
UNITED STATES PATENTS

| 692,678 | 2/1902 | Koelkebeck | 263/20 |
|---|---|---|---|
| 1,243,311 | 10/1917 | Loder | 263/20 |
| 1,857,364 | 10/1932 | DeRachat | 263/20 |
| 2,260,166 | 10/1941 | Cope | 431/346X |
| 3,476,368 | 11/1969 | Saiki | 263/20 |

Primary Examiner—John J. Camby
Attorney—Wolfe, Hubbard, Leydig, Voit and Osann

ABSTRACT: A jacket extends around the refractory wall of a gas-fired kiln and defines an air chamber within which air is heated by the heat from the wall prior to being delivered to gas-air mixers and used as combustion air. Ceramic burner blocks are fitted within the wall and are formed with specially designed fuel delivery passages which cause ignition of the fuel mixture to be delayed until the mixture is nearly within the work chamber of the kiln and which also, in one embodiment of the invention, direct the resultant flame around the wall of the kiln.

PATENTED JUN 8 1971
3,583,691
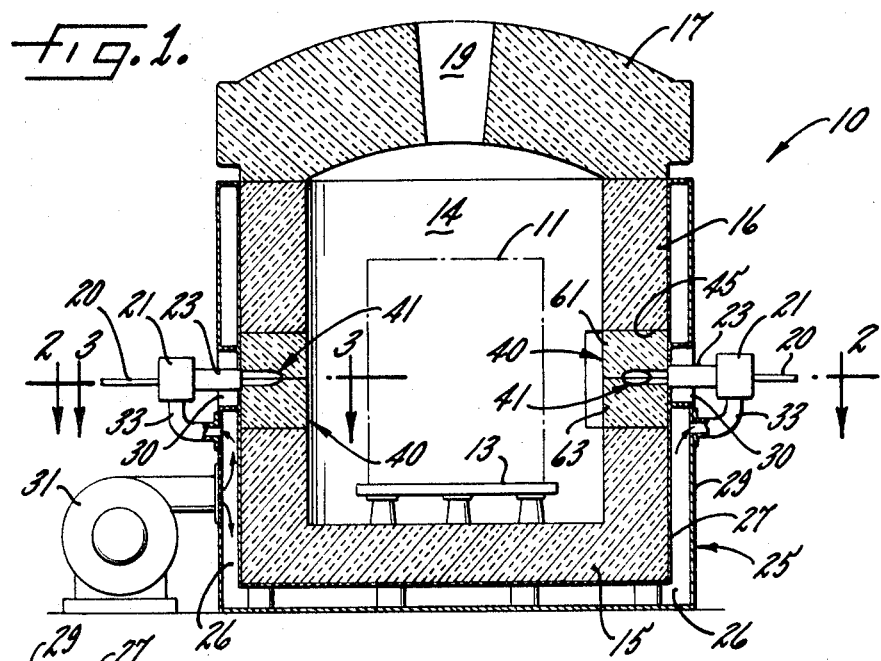
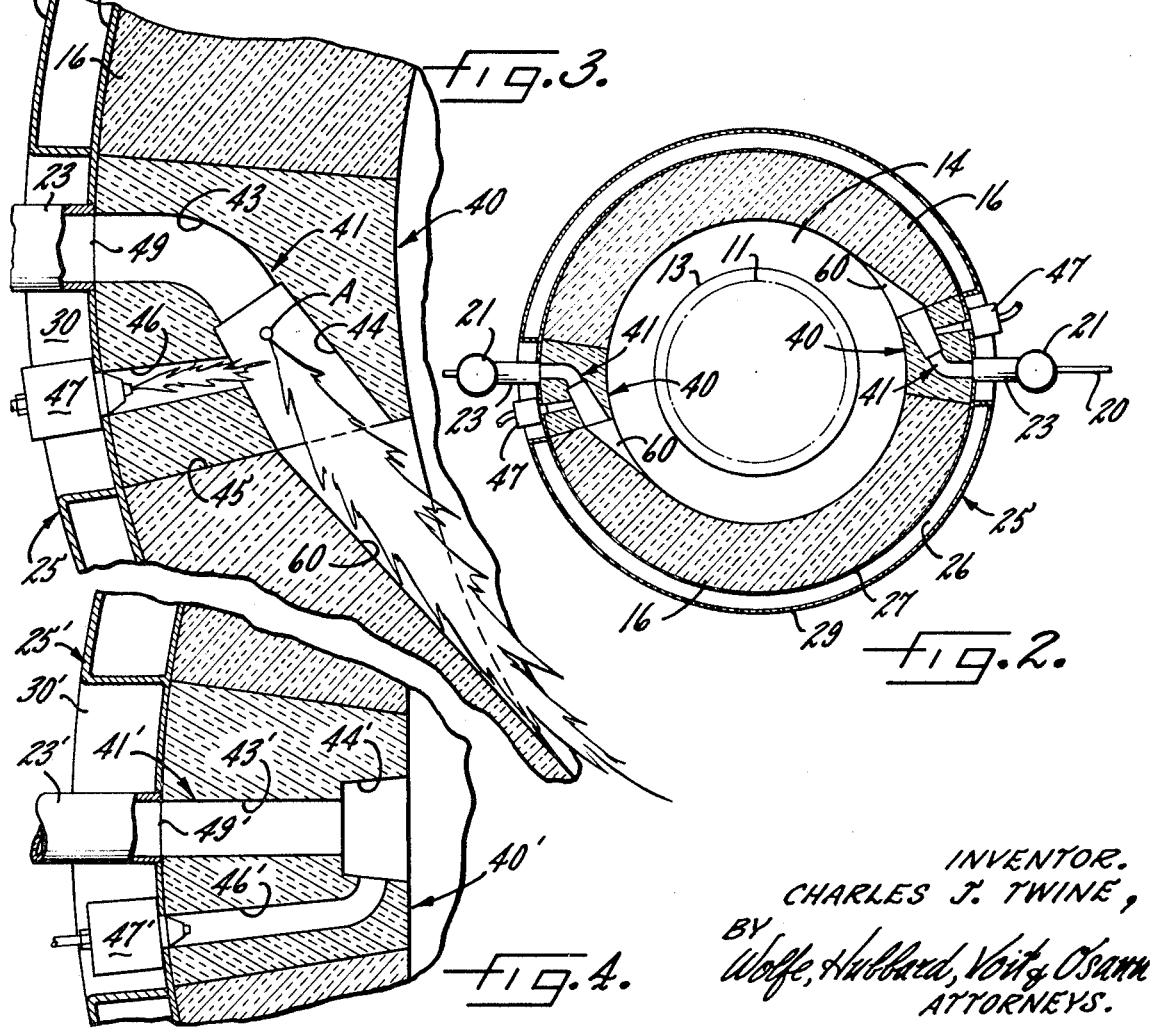
INVENTOR.
CHARLES J. TWINE,
BY Wolfe, Hubbard, Voit & Osann
ATTORNEYS.

(# 3,583,691)

FURNACE WITH PREHEATED COMBUSTION AIR AND CERAMIC BURNER BLOCKS

BACKGROUND OF THE INVENTION

This invention relates generally to a furnace of the type having a work chamber defined by a walled enclosure which usually is constructed of refractory material. More particularly, the invention pertains to a furnace in which a fuel such as gas is mixed with combustion air, the resulting mixture then being delivered to and ignited in the work chamber to heat the latter. To promote efficient combustion and to increase the release of energy from the fuel, the combustion air often is preheated before being mixed with the gas and delivered to the work chamber.

SUMMARY OF THE INVENTION

One aim of the present invention is to preheat the combustion air in a furnace of the above character with a new and improved arrangement which is simpler and less expensive than systems previously used for this purpose. In large, these ends are achieved by utilizing the heat radiating from the furnace to preheat air which thereafter is mixed with the gas for use as combustion air.

In a more specific sense, the invention resides in the provision of a novel jacket extending around the furnace wall and defining alongside the wall an air chamber within which combustion air is heated by the heat from the wall before being mixed with the gas.

Another object of the invention is to provide a unique burner block within the furnace wall for delivering the fuel mixture to the work chamber, the block being effective to additionally preheat the mixture and, at the same time, to reduce the amount of needless heating of the furnace wall by delaying ignition of the mixture until the latter has been projected into the work chamber. This aspect of the invention also is characterized by the novel construction of the burner block to direct the mixture and the resultant flame around and in close contact with the inner side of the work chamber.

Other objects and advantages of the invention will become apparent from the following detailed description when taken in conjunction with the accompanying drawings.

BRIEF DESCRIPTION OF THE DRAWINGS

FIG. 1 is a cross-sectional view taken vertically through a new and improved furnace embodying the novel features of the present invention.

FIG. 2 is a fragmentary cross section taken substantially along the line 2-2 of FIG. 1.

FIG. 3 is an enlarged fragmentary cross section taken substantially along the line 3-3 of FIG. 1 and showing one type of burner block embodying the features of the invention.

FIG. 4 is a view similar to FIG. 3 but showing a modified burner block.

DETAILED DESCRIPTION OF THE PREFERRED EMBODIMENTS

As shown in the drawings for purposes of illustration, the invention is embodied in a furnace in the form of a kiln 10 (FIG. 1) for heating workpieces 11 to high temperatures ranging up to 3200° Fahrenheit. Herein, the workpieces rest upon a hearth 13 disposed within a work chamber 14 which is of circular cross section and which is defined by an enclosure formed by a bottom wall 15 and by generally cylindrical sidewalls 16 made of refractory material such as ceramic brick. The top of the chamber is closed by a refractory roof 17 which may be removed to enable loading of the workpieces into the chamber.

Heating of the chamber 14 is effected by delivering a mixture of gas and combustion air into the chamber and by igniting the mixture to create a flame for raising the temperature of the chamber and the workpieces 11, the products of combustion being exhausted from the chamber through a flue 19 in the roof 17. In this instance, the gas flows from supply lines 20 to a series of mixer units 21 spaced angularly around the outside of the sidewalls 16 and operable to mix the gas in proper proportions with air prior to delivering the mixture to the chamber through nozzles 23. Usually, the air is preheated to an elevated temperature before being mixed with the gas so as to enable the release of more heat energy from the mixture and thereby effect more efficient heating of the chamber to high temperatures.

According to one aspect of the present invention, advantage is taken of the heat contained in the walls 15 to 16 to preheat air for use as combustion air in a simpler and less expensive manner than has been possible heretofore. For these purposes, a jacket 25 extends around the walls and defines an enclosed air chamber 26 to which ambient air is supplied, such air being raised to an elevated temperature by the heat from the walls and then being delivered to the mixers 21 for mixture with the gas. With this arrangement, the combustion air may be preheated without the need of comparatively expensive auxiliary equipment such as heat exchangers, recouperators and the like and without need for a complex piping system for delivering the preheated air to the mixers.

In the present instance, the jacket 25 is formed by inner and outer steel sheets 27 and 29 extending around the outer sides of the bottom wall 15 and the side walls 16. The inner sheet lies directly alongside the walls and advantageously helps support and rigidify the refractory brick while the outer sheet is spaced outwardly from the inner sheet and cooperates therewith to define the air chamber. Adjacent the mixers 21, the outer sheet is bent inwardly to form recesses 30 enabling attachment of the nozzles 23 to the inner sheet directly adjacent the outer sides of the walls 16.

Ambient air is supplied under pressure to the air chamber 26 by a centrifugal blower 31 (FIG. 1) located outside of the kiln 10 and communicating with the air chamber through an opening in the outer sheet 29. To deliver the air in the chamber 26 to the mixers 21, pipes 33 simply are connected into the outer sheet and extended to the mixers, only a single pipe being required for each mixer.

With the foregoing arrangement, a suitable volume of air is delivered into and circulated through the air chamber 26 by the blower 31 and contacts the inner metal sheet 27 of the jacket 25. When the kiln 10 is fired, heat generated in the work chamber 14 is conducted outwardly through the refractory walls 15 and 16 and raises the temperature of the inner sheet which, in turn, heats the air being circulated through the chamber 26. The air thus heated is delivered to the mixers 26 through the pipes 33 for use as combustion air and is mixed with the gas for delivery into the work chamber 14 through the nozzles 23. With the combustion air preheated, more of the fuel mixture may be combusted in a given time to enable the attainment of a high operating temperature in the work chamber.

From the foregoing, it will be apparent that the present invention brings to the art an extremely low cost arrangement for preheating combustion air since only the jacket 25 and the pipes 33 need be added to a conventional kiln to enable the heat generated in the work chamber 14 to be used for preheating purposes. The piping is quite simple and, through the use of the jacket extending around the sidewalls 16, a large number of mixers 21 may be located at desired locations around the walls and supplied with preheated combustion air from the air chamber 26.

The present invention also contemplates the provision of new and improved burner blocks 40 (FIGS. 1 and 3) disposed within the sidewalls 16 and communicating with the mixers 21 to deliver the fuel mixture through the walls and into the work chamber 14 without causing premature combustion of the mixture and needless heating of the outer portions of the walls. To these ends, each block is formed with a fuel passage 41 (FIG. 3) having an outer portion 43 forming a continuation of the nozzle 23 and sized to cause the mixture to flow at a velocity greater than its combustion rate so that the mixture remains uncombusted while flowing through the outer portion and past the major portion of the wall 16. Near its inner end, the passage is formed with an enlarged portion 44 which causes a reduction in the velocity of the mixture to allow ignition to occur at the inner side of the block adjacent the work chamber. As a result, ignition is delayed until the mixture has passed almost entirely through the wall and is within or nearly within the work chamber thereby to avoid wasting heat by needlessly heating the wall.

Herein, each burner block 40 is made of a refractory ceramic material such as alumina and is fitted into an opening 45 (FIG. 3) formed through the sidewall 16. A pilot port 46 is formed through the block and communicates between the inner portion 44 of the passage 41 and a pilot unit 47 mounted on the jacket 25 to project a pilot flame into the passage for igniting the mixture. The outer portion 43 of the passage 41 extends through the major width of the block, is of circular cross section, and is formed with a substantially constant diameter throughout its length. At its outer end, the outer passage portion 43 communicates directly with the nozzle 23, the latter terminating in a circular orifice 49 (FIG. 3) whose diameter is selected according to the heat input required to raise the work chamber to its operating temperature. The diameter of the outer portion of the passage is the same as that of the orifice and is such that the fuel mixture flows through the outer portion at a velocity greater than its combustion rate and thus is not ignited within the outer portion by the pilot flame.

As shown most clearly in FIG. 3, the diameter of the inner portion 44 of the passage 41 is approximately twice as great as that of the outer portion so that the fuel mixture undergoes a sharp reduction in velocity upon entering the inner portion. Accordingly, the mixture is ignited by the pilot flame at approximately the point A (FIG. 3) adjacent the work chamber 14 and the inner side of the wall 16 so as to produce a high temperature flame which shoots into the chamber to heat the latter.

Since ignition of the fuel mixture is delayed while the mixture flows uncombusted through the outer portion 43 of the passage 41, the heat in the mixture is released adjacent the chamber 14 rather than back in the burner block 40. As a result, the needless heating of the block and the sidewalls 16 along their outer sides is reduced to effect more efficient and economical utilization of the fuel. Moreover, since the block is heated by the heat within the work chamber, the fuel mixture flowing through the outer portion 41 of the passage is preheated by an additional amount before being ignited.

Advantageously, the outer portion 43 of each passage 41 extends inwardly from the outer side of its respective burner block 40 along a radius of the cylindrical work chamber 14 to simplify the connecting of the nozzle 23 to the passage and to facilitate the mounting of the nozzle on the inner sheet 27 of the jacket 25. About one third of the way through the block, the outer portion of the passage begins curving to meet the inner portion 44 of the passage as shown in FIG. 3. The inner portion opens out of the side of the block and faces in a direction to guide the flame along a path extending generally tangent to and in close contact with the inner side of the cylindrical sidewall 16. The inner side of the wall is gradually relieved inwardly as indicated at 60 in FIG. 3 along a tangent extending into the opening 45 to the open end of the inner portion 44 thereby to form a continuation of the inner portion along the inner side of the wall 16 for directing the flame along the inner side. The flame thus hugs the inner wall to promote heating of the wall and effective radiation of heat therefrom to the workpieces 11 and, at the same time, is restricted from impinging directly upon the workpieces.

To simplify manufacture of the burner blocks 40, each block is formed by upper and lower ceramic sections 61 and 63 (FIG. 1) which are fitted together in the opening 45 in face-to-face relationship. The opposing faces of the blocks are molded with concave recesses which, when the blocks are fitted together, mate with one another to form the passage 41. The passage thus may be formed much easier and at lower cost than would be the case if a single ceramic section were used as the burner block.

A modified burner block 40' is shown in FIG. 4 in which elements of the block corresponding to those of the block of the first embodiment are indicated by the same but primed reference numerals. In this instance, the burner block 40' is formed with a passage 41' having an outer portion 43' and an enlarged inner portion 44', but the entire passage extends straight through the block rather than being curved. A burner block of this type usually is used in conjunction with a kiln having work chamber with a rectangular cross section.

I claim:

1. In a furnace, the combination of, a walled enclosure of refractory material defining a work chamber, a fuel mixer communicating with said work chamber and adapted for connection to a source of fuel gas, said mixer being operable to mix the gas with combustion air to create a gas-air mixture for delivery to and ignition in said work chamber to raise the temperature of the latter and said enclosure, a jacket extending along the outer wall of said enclosure and defining an air chamber immediately adjacent said outer wall whereby air in said air chamber is heated by the heat from the enclosure, mechanism for forcing outside air into said air chamber, means communicating between said air chamber and said fuel mixer for delivering the heated air in the air chamber to the mixer for use as combustion air, a nozzle for directing the fuel mixture from said mixer to said work chamber and having an outlet orifice of predetermined diameter adjacent said jacket, a burner block of refractory material fitted within the wall of said enclosure, a passage extending through said burner block and establishing communication between said nozzle and said work chamber, said passage having an outer portion forming a continuation of said orifice and having a a diameter substantially equal to that of the orifice to cause flow of the fuel mixture through the outer portion at a velocity greater than the combustion rate of the mixture whereby the mixture flows uncombusted through said outer portion and is heated by said block, and said passage having an inner portion adjacent the inner wall of said enclosure and of a substantially greater diameter than the outer portion thereby to reduce the velocity of the mixture and permit ignition of the mixture adjacent the inner wall of the enclosure.

2. A furnace as defined in claim 1 including a plurality of fuel mixers spaced around said enclosure, communicating with said work chamber and adapted for connection to the fuel source, each of said mixers communicating with said air chamber to receive heated combustion air therefrom.

3. A furnace as defined in claim 2 in which said jacket is formed by inner and outer sheets, said inner sheet being disposed face-to-face with the outer wall of said enclosure and helping support said refractory material, said outer sheet being spaced outwardly from said inner sheet and coacting therewith to define said air chamber.

4. A furnace as defined in claim 1 in which said work chamber is of generally circular cross section, the outer portion of said passage extending from the outer side of said burner block along a radius of said work chamber and then curving within said block to meet said inner portion, said inner portion of said passage facing in a direction to direct the flame resulting from ignition of the mixture along a path extending generally tangent to and in close contact with the inner wall of said enclosure.

5. In a furnace, the combination of, a walled enclosure of refractory material defining a work chamber, a fuel mixer adapted for connection to a source of fuel gas and operable to mix the gas with combustion air to create a gas-air mixture, a nozzle for directing the mixture from said mixer and having an outlet orifice of predetermined diameter adjacent the outer side of said enclosure, a burner block of refractory material fitted within the wall of said enclosure and formed by two refractory sections fitted together in face-to-face relation, recesses formed in the opposing faces of said sections and coacting with one another to define a passage extending through said burner block and establishing communication between said nozzle and said work chamber, said passage having an outer portion forming a continuation of said orifice and having a diameter substantially equal to that of the orifice to cause flow of the fuel mixture through the outer portion at a velocity greater than the combustion rate of the mixture whereby the mixture flows uncombusted through said outer portion and is heated by said block, and said passage having an inner portion adjacent the inner side of said enclosure and of a substantially greater diameter than the outer portion thereby to reduce the velocity of the mixture and permit ignition of the mixture adjacent the inner side of the enclosure.

6. A furnace as defined in claim 5 in which said work chamber is of generally circular cross section, the outer portion of said passage extending from the outer side of said burner block along a radius of said work chamber and then curving within said block to meet said inner portion, said inner portion of said passage opening into the chamber in a direction to direct the flame resulting from ignition of the mixture in a path extending generally tangent to and in close contact with the inner side of said enclosure.

7. In a furnace, the combination of, a walled enclosure having generally cylindrical inner and outer sides and defining a work chamber of circular cross section, a fuel mixer adapted for connection to a source of fuel gas and operable to mix the gas with combustion air to create a gas-air mixture, a nozzle for directing the mixture from said mixer and having an outlet orifice of predetermined diameter adjacent the outer side of said enclosure, a burner block of refractory material fitted within the wall of said enclosure, a passage extending through said burner block and establishing communication between said nozzle and said chamber, said passage having an outer portion opening out of the outer side of said block and communicating with said orifice, said outer portion forming a continuation of said orifice and being formed throughout its length with a substantially constant diameter approximately equal to that of the orifice to cause flow of the mixture through the outer portion at a velocity greater than the combustion rate of the mixture whereby the mixture flows uncombusted through said outer portion, said passage having an inner portion adjacent the inner side of said enclosure and of a substantially greater diameter than the outer portion thereby to reduce the velocity of the mixture and permit ignition of the mixture adjacent the inner side of the enclosure, the outer portion of said passage extending from the outer side of said burner block along a radius of said chamber and then curving within said block to meet said inner portion, said inner portion of said passage opening into the chamber in a direction to direct the flame resulting from ignition of the mixture in a path extending generally tangent to and in close contact with the inner side of said enclosure.

8. A furnace as defined in claim 7 in which said burner block is fitted within an opening in the wall of said enclosure, the inner portion of said passage opening out of one sidewall of said burner block and facing the adjacent sidewall of said opening, and the inner side of said enclosure being gradually relieved along a tangent extending into said opening and to the open end of the inner portion of said passage thereby to form a continuation of said inner portion along the inner side of said enclosure.

9. A furnace as defined in claim 8 in which said burner block is formed by two refractory sections fitted together in face-to-face relation, and recesses formed in the opposing faces of said sections and coacting with one another to define said passage.